US012716285B2

(12) United States Patent
Minaker et al.

(10) Patent No.: US 12,716,285 B2
(45) Date of Patent: Aug. 25, 2026

(54) POWER DUAL DIRECTION TAILGATE WITH SINGLE DRIVING MOTOR

(71) Applicants: Hyundai Motor Company, Seoul (KR); Kia Corporation, Seoul (KR)

(72) Inventors: Eoin Minaker, Superior Township, MI (US); Kihyun Cho, Gyeonggi-do (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 157 days.

(21) Appl. No.: 18/581,564

(22) Filed: Feb. 20, 2024

(65) Prior Publication Data

US 2025/0263963 A1 Aug. 21, 2025

(51) Int. Cl.
*E05F 15/614* (2015.01)
*B62D 33/027* (2006.01)

(52) U.S. Cl.
CPC ........ *E05F 15/614* (2015.01); *B62D 33/0273* (2013.01); *E05Y 2201/216* (2013.01); *E05Y 2900/546* (2013.01)

(58) Field of Classification Search
CPC ....... E05F 15/614; E05F 15/611; E05F 15/63; B62D 33/0273; B62D 33/03
See application file for complete search history.

(56) References Cited

U.S. PATENT DOCUMENTS 4,530,185 A * 7/1985 Moriya ................ E05F 15/603 49/300
5,688,019 A * 11/1997 Townsend ............ B60R 21/207 296/146.4
6,412,223 B1 * 7/2002 Hiebl ..................... E05B 81/25 49/352
6,588,828 B2 * 7/2003 Fisher .................... E05F 15/40 49/502
6,803,733 B1 * 10/2004 Shabana .............. E05F 11/486 296/146.12
7,644,540 B2 * 1/2010 Ichinose .............. E05F 15/627 49/340
2012/0324793 A1 * 12/2012 Abbasi .............. B62D 33/0273 49/168
2015/0361710 A1 * 12/2015 Hansen ................ E05F 15/614 296/50
2020/0340282 A1 * 10/2020 Sproule .................. F16D 28/00
2021/0245817 A1 * 8/2021 Gibbs .................... B62D 33/03
2021/0403097 A1 * 12/2021 Gase ................. B62D 33/0273
2022/0363321 A1 * 11/2022 Adams ................... E05F 15/63
2024/0159098 A1 * 5/2024 Kim ...................... E05F 15/635
2024/0391537 A1 * 11/2024 Prior ..................... B62D 33/03
2025/0033709 A1 * 1/2025 Hemphill .......... B62D 33/0273

* cited by examiner

*Primary Examiner* — Gregory J Strimbu
(74) *Attorney, Agent, or Firm* — Fox Rothschild LLP

(57) ABSTRACT

A dual-axis motor tailgate includes a gate portion having first and second hinges. The gate portion may be configured to rotate about an axis of the first hinge and a portion of the gate portion may be configured to rotate about an axis of the second hinge. A drive motor may be configured to rotate a drive gear. The dual-axis motor tailgate may include a clutch motor and a clutch. The clutch motor may be configured to cause the clutch to engage the first hinge with the drive gear, disengage the first hinge with the drive gear, engage the second hinge with the drive gear, and disengage the second hinge with the drive gear, where rotation of the first and second hinges causes rotation of the gate portion and the portion of the gate portion about the axes of the first and second hinges, respectively.

12 Claims, 10 Drawing Sheets

124
110
114
106
104
140
118
116
122
108
132
112
130

POWER DUAL DIRECTION TAILGATE WITH SINGLE DRIVING MOTOR

BACKGROUND

Technical Field

Embodiments of the present disclosure relate to vehicle power tailgate structures and, in particular, to power dual direction tailgate systems with a single driving motor and methods of use.

Background

Pickup trucks generally have a tailgate which can be opened and closed along a singular axis. This enables access to the truck bed. Some pickup trucks have systems for using a motor to open the tailgate along the singular axis.

Some pickup trucks have a tailgate which is configured to be opened along a plurality of axes. However, powered tailgates are configured to open the tailgate along a singular axis.

For at least these reasons, there is a need for a system for powering open a tailgate along a plurality of axes using a singular motor.

SUMMARY

According to an object of the present disclosure, a dual-axis motor tailgate is provided. The dual-axis motor tailgate may comprise a gate portion comprising a first hinge and a second hinge. The gate portion may be configured to rotate about the first hinge and a portion of the gate portion may be configured to rotate about the second hinge. The dual-gate portion may comprise a first hinge gear. The first hinge gear may be configured such that rotation of the first hinge gear causes the gate portion to rotate about the first hinge. The dual-axis motor tailgate may comprise a second hinge gear. The second hinge gear may be configured such that rotation of the second hinge gear causes the portion of the gate portion to rotate about the second hinge. The dual-axis motor tailgate may comprise a drive motor and a drive gear. The drive motor may be configured to rotate the drive gear. The dual-axis motor tailgate may comprise a clutch motor and a clutch. The clutch motor may be configured to cause the clutch to engage the first hinge gear with the drive gear, disengage the first hinge gear with the drive gear, engage the second hinge gear with the drive gear, and disengage the second hinge gear with the drive gear.

According to an exemplary embodiment, the drive motor may be configured to rotate the first hinge gear when the first hinge gear is engaged with the drive gear.

According to an exemplary embodiment, the drive motor may be configured to rotate the second hinge gear when the second hinge gear is engaged with the drive gear.

According to an exemplary embodiment, the dual-axis motor tailgate may further comprise one or more slotted rails. The drive motor may be coupled to the one or more slotted rails. The drive motor may be configured to move along one or more slots within the one or more slotted rails. The clutch motor may be configured to cause the clutch to move the drive motor along the one or more slots within the one or more slotted rails.

According to an exemplary embodiment, the first hinge may comprise a pivot-cup hinge.

According to an exemplary embodiment, the dual-axis motor tailgate may further comprise a spindle drive coupled to the second hinge gear. The second hinge gear may be configured to rotate the spindle drive when the second hinge gear is rotated.

According to an exemplary embodiment, the dual-axis motor tailgate may further comprise a first latch that may be configured, when engaged, to prevent the gate portion from rotating about the first hinge.

According to an exemplary embodiment, the dual-axis motor tailgate may further comprise a second latch that may be configured, when engaged, to prevent the portion of the gate portion from rotating about the second hinge.

According to an exemplary embodiment, the dual-axis motor tailgate may further comprise a computing device configured to control one or more of: the drive motor; and the clutch motor.

According to an object of the present disclosure, a method for controlling a dual-axis motor tailgate is provided. The method may comprise, using a computing device, determining whether a standard open switch or a side open switch has been pressed. The method may further comprise, when the standard open switch has been pressed, using the computing device, determining whether a gate portion of a dual-axis motor tailgate is fully latched, determining whether a vehicle on which the dual-axis motor tailgate is mounted is stopped, and, when the gate portion is fully latched and the vehicle is stopped, rotating a clutch of the dual-axis motor tailgate, using a clutch motor, to cause a first hinge gear to engage a drive gear and rotating a drive motor to cause the drive gear to rotate the first hinge gear, causing the gate portion to rotate about a first hinge. The method may further comprise, when the side open switch has been pressed, using the computing device, determining whether the gate portion of a dual-axis motor tailgate is fully latched, determining whether a vehicle on which the dual-axis motor tailgate is mounted is stopped, and, when the gate portion is fully latched and the vehicle is stopped, rotating the clutch of the dual-axis motor tailgate, using the clutch motor, to cause a second hinge gear to engage the drive gear and rotating the drive motor to cause the drive gear to rotate the second hinge gear, causing the portion of the gate portion to rotate about a second hinge.

According to an exemplary embodiment, the method may further comprise, prior to rotating the drive motor to cause the drive gear to rotate the first hinge gear, releasing a first latch. The first latch may be configured, when engaged, to prevent the gate portion from rotating about the first hinge.

According to an exemplary embodiment, the method may further comprise, prior to rotating the drive motor to cause the drive gear to rotate the second hinge gear, releasing a second latch. The second latch may be configured, when engaged, to prevent the portion of the gate portion from rotating about the second hinge.

According to an exemplary embodiment, determining whether a gate portion of a dual-axis motor tailgate is fully latched when the standard open switch has been pressed may further comprise determining whether a first latch and a second latch are engaged.

According to an exemplary embodiment, determining whether a gate portion of a dual-axis motor tailgate is fully latched when the side open switch has been pressed may further comprise determining whether the first latch and the second latch are engaged.

According to an exemplary embodiment, the drive motor may be coupled to one or more slotted rails.

According to an exemplary embodiment, the drive motor may be configured to move along one or more slots within the one or more slotted rails.

According to an exemplary embodiment, the clutch motor may be configured to cause the clutch to move the drive motor along the one or more slots within the one or more slotted rails.

According to an exemplary embodiment, rotating the clutch, when the standard open switch has been pressed, may comprise moving the drive motor along the one or more slots within the one or more slotted rails.

According to an exemplary embodiment, rotating the clutch, when the side open switch has been pressed, may comprise moving the drive motor along the one or more slots within the one or more slotted rails.

According to an exemplary embodiment, the first hinge may comprise a pivot-cup hinge.

According to an exemplary embodiment, the dual-axis motor tailgate may further comprise a spindle drive coupled to the second hinge gear.

According to an exemplary embodiment, when the side open switch has been pressed, rotating the drive motor may comprise rotating the spindle drive when the second hinge gear is rotated.

According to an object of the present disclosure, a dual-axis motor tailgate system is provided. The dual-axis motor tailgate system may comprise a vehicle and a dual-axis motor tailgate, coupled to the vehicle. The dual-axis motor tailgate may comprise a gate portion comprising a first hinge and a second hinge. The gate portion may be configured to rotate about the first hinge and a portion of the gate portion may be configured to rotate about the second hinge. The dual-gate portion may comprise a first hinge gear. The first hinge gear may be configured such that rotation of the first hinge gear causes the gate portion to rotate about the first hinge. The dual-axis motor tailgate may comprise a second hinge gear. The second hinge gear may be configured such that rotation of the second hinge gear causes the portion of the gate portion to rotate about the second hinge. The dual-axis motor tailgate may comprise a drive motor and a drive gear. The drive motor may be configured to rotate the drive gear. The dual-axis motor tailgate may comprise a clutch motor and a clutch. The clutch motor may be configured to cause the clutch to engage the first hinge gear with the drive gear, disengage the first hinge gear with the drive gear, engage the second hinge gear with the drive gear, and disengage the second hinge gear with the drive gear.

According to an exemplary embodiment, the drive motor may be configured to rotate the first hinge gear when the first hinge gear is engaged with the drive gear.

According to an exemplary embodiment, the drive motor may be configured to rotate the second hinge gear when the second hinge gear is engaged with the drive gear.

According to an exemplary embodiment, the dual-axis motor tailgate may further comprise one or more slotted rails.

According to an exemplary embodiment, the drive motor may be coupled to the one or more slotted rails.

According to an exemplary embodiment, the drive motor may be configured to move along one or more slots within the one or more slotted rails.

According to an exemplary embodiment, the clutch motor may be configured to cause the clutch to move the drive motor along the one or more slots within the one or more slotted rails.

BRIEF DESCRIPTION OF THE DRAWINGS

The accompanying drawings, which are incorporated in and form a part of the Detailed Description, illustrate various non-limiting and non-exhaustive embodiments of the subject matter and, together with the Detailed Description, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

DETAILED DESCRIPTION

Figure 1:
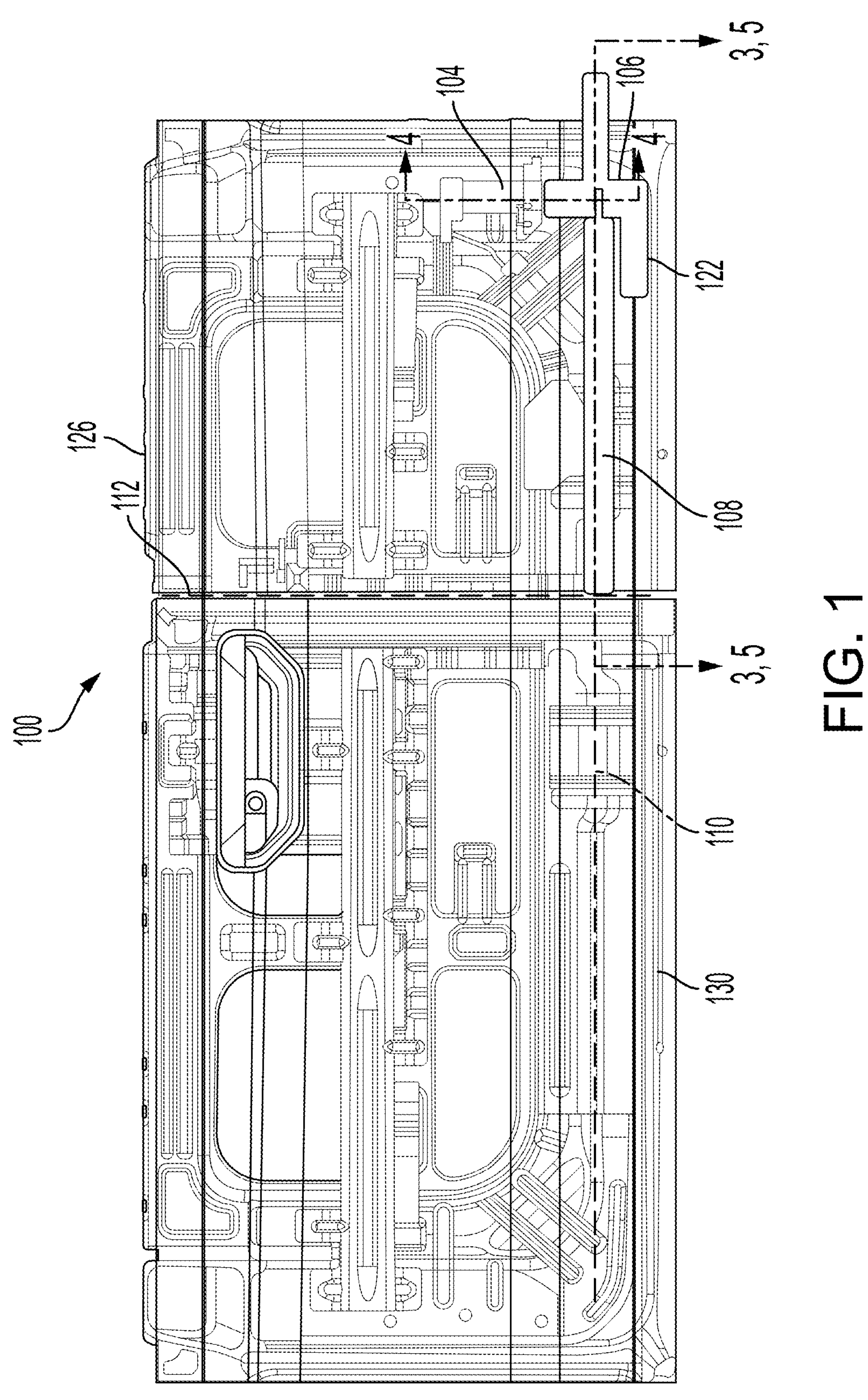
FIG. 1 illustrates a front view of a dual-axis power tailgate, according to an exemplary embodiment of the present disclosure.

The following Detailed Description is merely provided by way of example and not of limitation. Furthermore, there is no intention to be bound by any expressed or implied theory presented in the preceding background or in the following Detailed Description.

Reference will now be made in detail to various exemplary embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications, and equivalents, which may be included within the spirit and scope of the various embodiments as defined by the appended claims. Furthermore, in this Detailed Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Some portions of the detailed descriptions which follow are presented in terms of procedures, logic blocks, processing, and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities may take the form of electrical or magnetic signals capable of being stored, transferred, combined, compared, and otherwise manipulated in an electronic system, device, and/or component.

It should be borne in mind, however, that these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "determining," "communicating," "taking," "comparing," "monitoring," "calibrating," "estimating," "initiating," "providing," "receiving," "controlling," "transmitting," "isolating," "generating," "aligning," "synchronizing." "identifying." "maintaining," "displaying," "switching," or the like, refer to the actions and processes of an electronic item such as: a processor, a sensor processing unit (SPU), a processor of a sensor processing unit, an application processor of an electronic device/system, or the like, or a combination thereof. The item manipulates and transforms data represented as physical (electronic and/or magnetic) quantities within the registers and memories into other data similarly represented as physical quantities within memories or registers or other such information storage, transmission, processing, or display components.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. In aspects, a vehicle may comprise an internal combustion engine system as disclosed herein.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example device vibration sensing system and/or electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof. digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As employed in the subject specification, the term "processor" can refer to substantially any computing processing unit or device comprising, but not limited to comprising, single-core processors; single-processors with software multithread execution capability: multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration. One or more components of an SPU or electronic device described herein may be embodied in the form of one or more of a "chip," a "package." an Integrated Circuit (IC).

Figure 2A:
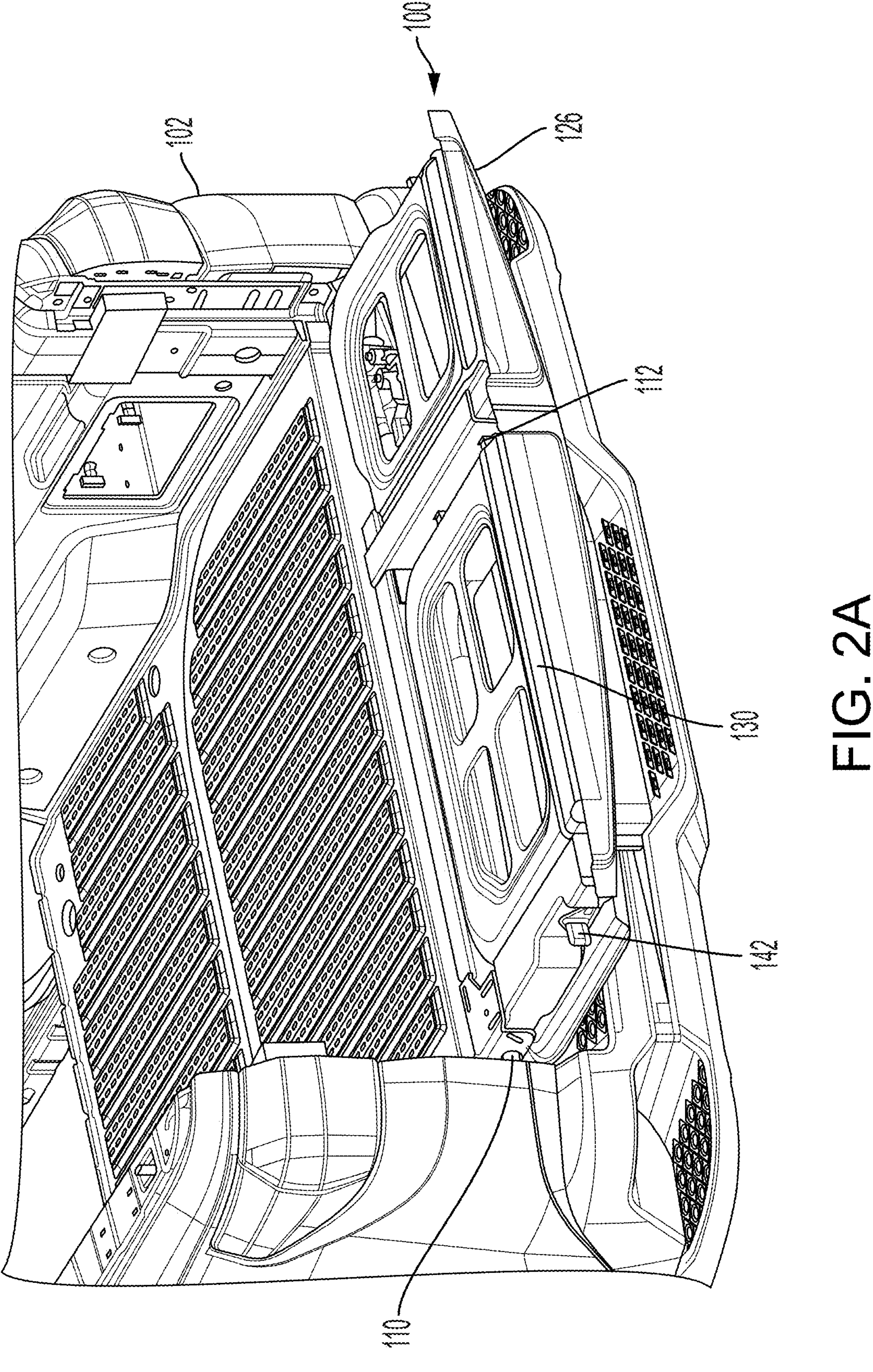
FIG. 2A illustrates a perspective view of a dual-axis power tailgate, mounted to a vehicle, opened along a first axis.
Figure 2B:
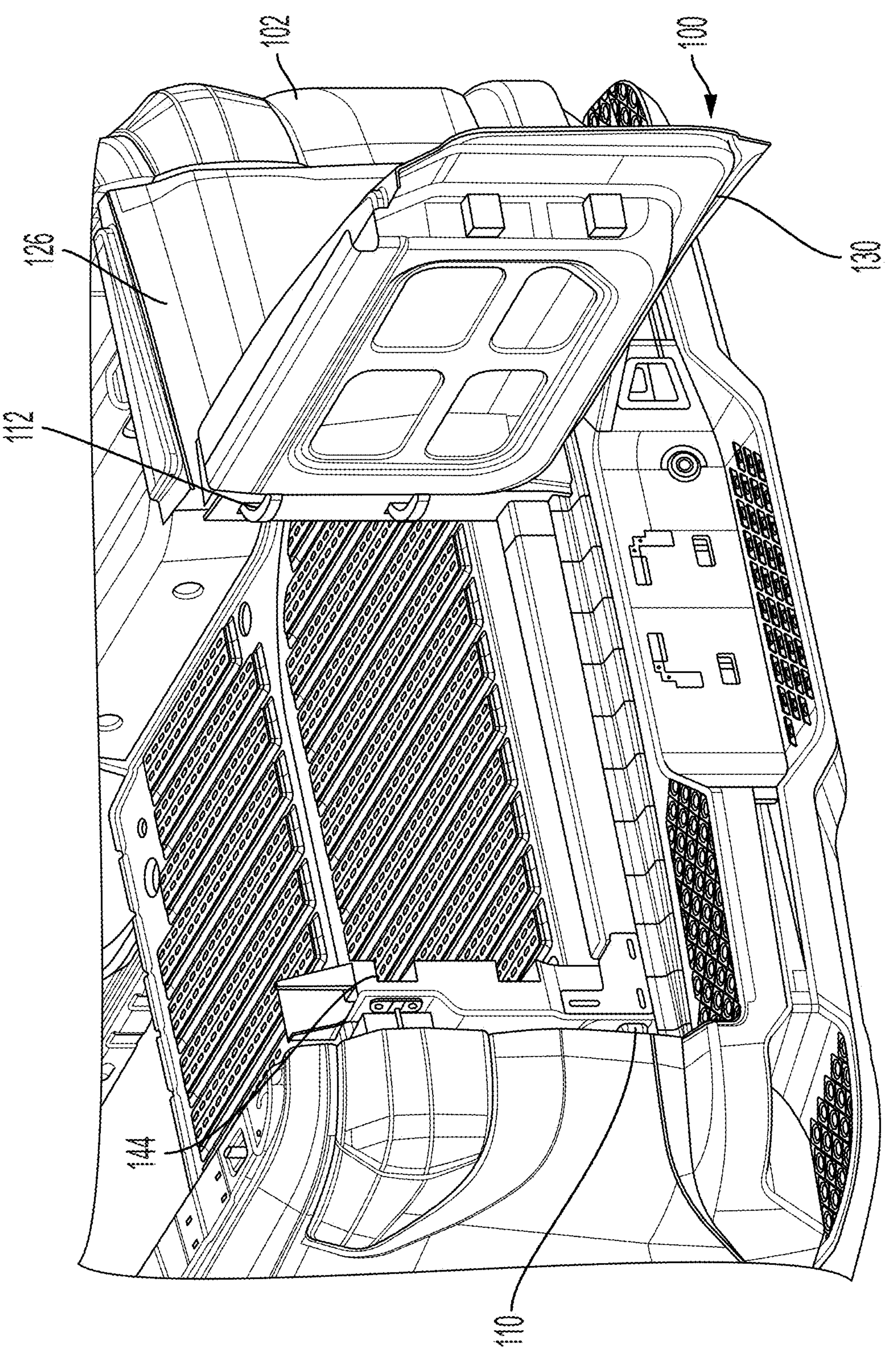
FIG. 2B illustrates a perspective view of the dual-axis tailgate and opened along a second axis.

Referring now to FIGS. 1-2B, a front view (FIG. 1) of a dual-axis power tailgate 100 and a perspective view of the dual-axis power tailgate 100, mounted to a vehicle 102, opened along a first axis (FIG. 2A) and opened along a second axis (FIG. 2B), are illustratively depicted, in accordance with exemplary embodiments of the present disclosure.

According to an exemplary embodiment, the dual-axis power tailgate 100 may comprise a drive motor 104, a clutch 106, and a spindle drive 108. According to an exemplary embodiment, the dual-axis power tailgate 100 may comprise a first hinge 110 and a second hinge 112, wherein the two hinges 110, 112 are on separate axes and are driven by a single drive motor 104. The dual-axis power tailgate 100 is configured to improve customer convenience when using a pickup tailgate.

Figure 3:
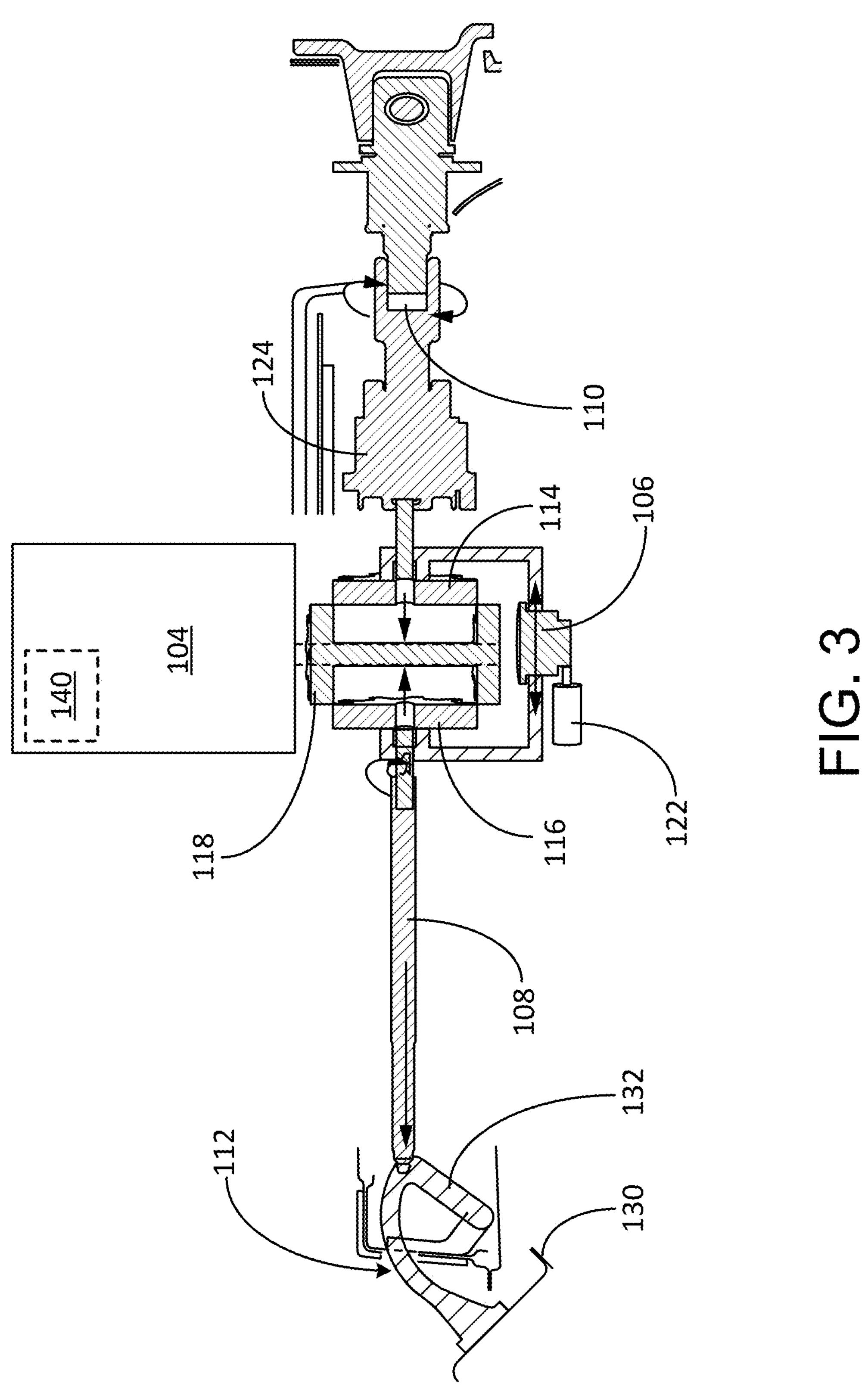
FIG. 3 illustrates a schematic view of a clutch-hinge interaction along section 3,5-3,5 of the dual-axis power tailgate of FIG. 1, according to an exemplary embodiment of the present disclosure.
Figure 4:
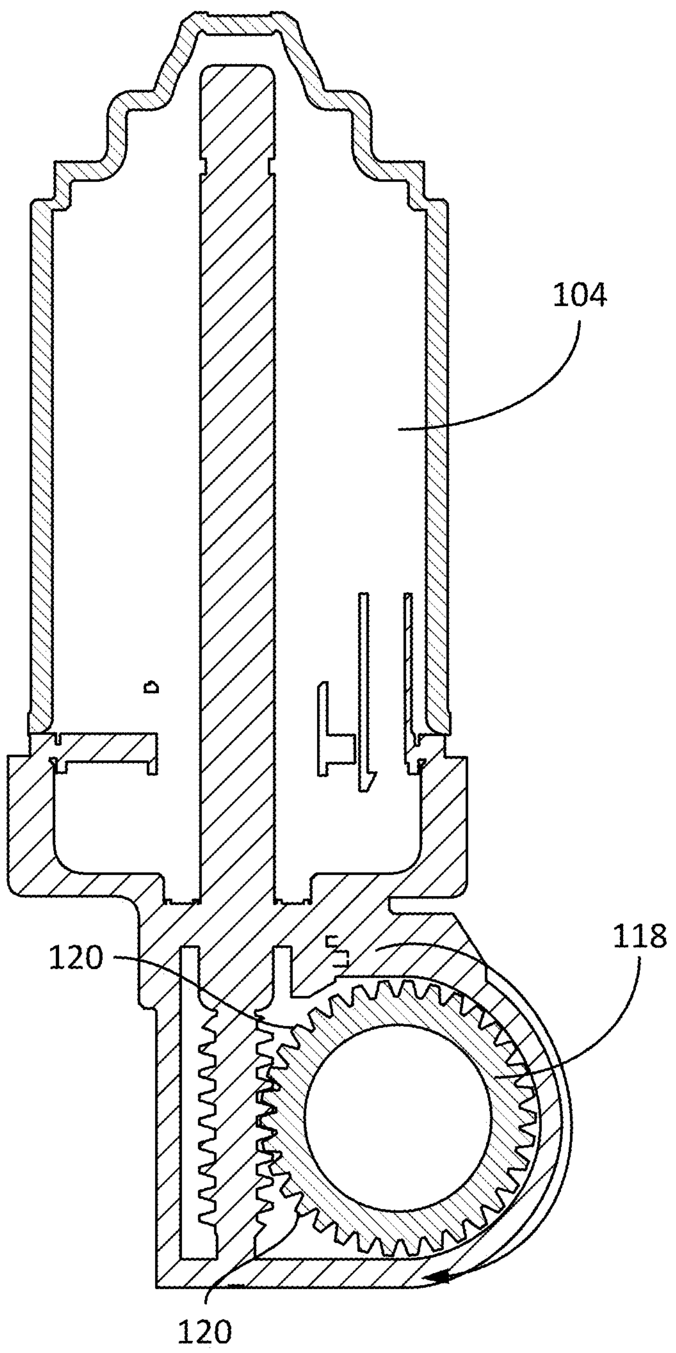
FIG. 4 illustrates a schematic view of a motor-clutch interaction along section 4-4 of the dual-axis power tailgate of FIG. 1, according to an exemplary embodiment of the present disclosure.
Figure 5:
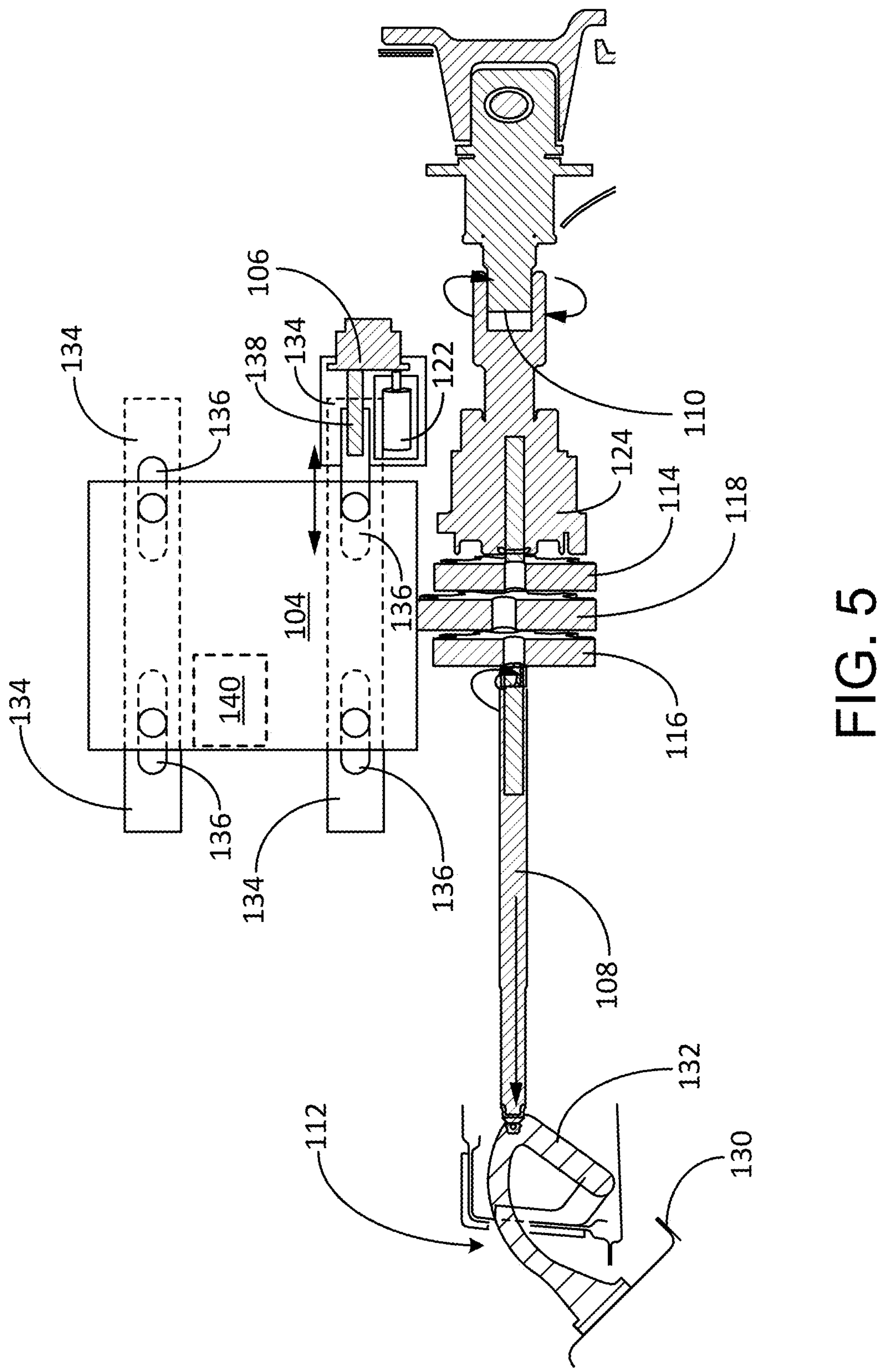
FIG. 5 illustrates a schematic view of a clutch-hinge interaction along section 3,5-3,5 of the dual-axis power tailgate of FIG. 1, according to an another exemplary embodiment of the present disclosure.

FIGS. 3-5 illustrate a schematic view (FIG. 3) of a clutch-hinge interaction along section 3,5-3,5 of the dual-axis power tailgate 100, as shown in FIG. 1, a schematic view (FIG. 4) of a motor-clutch interaction along section 4-4 of the dual-axis power tailgate 100, as shown in FIG. 1, and a schematic view (FIG. 5) of a clutch-hinge interaction along section 3, 5-3, 5 of the dual-axis power tailgate 100, as shown in FIG. 1 according to exemplary embodiments of the present disclosure.

According to an exemplary embodiment, the clutch 106 may comprise an electromagnetic-type clutch. It is noted, however, that other suitable types of clutches 106 may be incorporated while maintaining the spirit and functionality of the present disclosure. According to an exemplary embodiment, the clutch 106 may be configured to hold engagement and push a gear 114, 116 to mesh with one or more inner teeth 120 of a drive gear 118. According to an exemplary embodiment, the dual-axis power tailgate 100 may comprise a clutch motor 122 configured to power the clutch 106.

According to an exemplary embodiment, the clutch motor 120 may be configured to engage and/or disengage the clutch 106 to link the drive motor 104 to a desired hinge. According to an exemplary embodiment, in order to cause the dual-axis power tailgate 100 to rotate about the first hinge 110 (along the first axis), the clutch 106 may be configured to cause a first hinge gear 114 to engage the drive gear 118. According to an exemplary embodiment, in order to cause the dual-axis power tailgate 100 to rotate about the second hinge 112 (along the second axis), the clutch 106 may be configured to cause a second hinge gear 116 to engage the drive gear 118.

According to an exemplary embodiment, when the first hinge gear 114 is engaged with the drive gear 118, the drive motor 104 may be configured to cause the drive gear 118 to rotate, causing the first hinge gear 114 to rotate, in turn causing a first hinge gearbox 124 to rotate about the first hinge 110, causing the some or all of a tailgate gate 126 of the dual-axis power tailgate 100 to rotate about the first hinge 110 (e.g., causing the tailgate gate 126 to perform up and/or down movement). According to an exemplary embodiment, the first hinge 110 may be a pivot-cup hinge. It is noted, however, that other suitable types of hinge may be incorporated, while maintaining the spirit and functionality of the present disclosure.

According to an exemplary embodiment, when the second hinge gear 116 is engaged with the drive gear 118, the drive motor 104 may be configured to cause the drive gear 118 to rotate, causing the second hinge gear 116 to rotate, in turn causing a spindle drive 108 to rotate, causing a portion 130 of the tailgate gate 126 to rotate about the second hinge 112 (e.g., causing the portion 130 of the tailgate gate 126 to perform side opening and/or closing movement). According to an exemplary embodiment, the spindle drive 108 may be coupled to a protrusion 132 coupled to the portion 130 of the tailgate gate 106. The protrusion 132 may be configured such that pushing the protrusion 132 with the spindle drive 128 causes the portion 130 of the tailgate gate to open, and/or pulling the protrusion 132 with the spindle drive 108 causing the portion 130 of the tailgate gate 126 to close.

According to an exemplary embodiment, as shown in FIG. 3. the clutch motor 122 may be configured to cause the clutch 106 to push the first hinge gear 114 to engage and mesh with the teeth 120 of the drive gear 118 and pull the first hinge gear 114 to disengage the drive gear 118, and push the second hinge gear 116 to engage and mesh with the teeth 120 of the drive gear 118 and pull the second hinge gear 116 to disengage the drive gear 118.

According to an exemplary embodiment, the drive motor 104 may be mounted on a movable mount configured to enable the drive motor 104 to move along the movable mount. According to an exemplary embodiment, as shown in FIG. 5, the drive motor 104 may be mounted on one or more slotted rails 134 each slotted rail having an open slot 136. The drive motor 104 may be configured to move along the open slots 136 of the slotted rails 134, moving the drive gear 118 as the drive motor 104 moves along the slotted rails 134. According to an exemplary embodiment, the clutch motor 122 may be configured to cause the clutch 106 to move the drive motor 104 along the slotted rails 134. According to an exemplary embodiment, the clutch 106 may be configured to push and/or pull a pin 138, coupled to the drive motor 104, causing the drive motor 104 to move, causing the drive gear 118 to engage and/or disengage the first hinge gear 114 and/or the second hinge gear 116.

According to an exemplary embodiment, the dual-axis power tailgate 100 may comprise one or more computing devices 140. The one or more computing devices 140 may be configured to control the drive motor 104 and/or the clutch motor 122 and or cause the drive motor 104 and/or the clutch motor 122 to perform one or more of the functions described herein. The computing device 140 may be coupled to, a component of, and/or in wired and/or wireless connection with one or more of the drive motor 104 and the clutch motor 122.

According to an exemplary embodiment, the dual-axis power tailgate 100 may comprise one or more latches configured to secure a position of the gate 126 and/or a portion 130 of the gate 126. The one or more latches may comprise a first latch 142 and a second latch 144.

According to an exemplary embodiment, the first latch 142 may be configured, when engaged, to prevent the gate 126 from rotating about the first hinge 110. The dual-axis power tailgate 100 may be configured to release the first latch 142 prior to rotating the gate 126 about the first hinge 110.

According to an exemplary embodiment, the second latch 144 may be configured, when engaged, to prevent the portion 130 of the gate 126 from rotating about the second hinge 112. The dual-axis power tailgate 100 may be configured to release the second latch 144 prior to rotating the portion 130 of the gate 126 about the second hinge 112.

According to an exemplary embodiment, the first hinge 110 is configured to cause some or all of the tailgate gate 126 to rotate, causing up/down movement, and the second hinge 112 is configured to cause a portion 130 of the tailgate gate 126 to rotate, causing side opening/closing movement. It is noted, however, the one or more of the first hinge 110 and/or second hinge 112 may be configured to cause the tailgate gate 126 and/or a portion thereof to rotate in any suitable direction, while maintaining the spirit and functionality of the present disclosure. It is also noted that, while the figures show a tailgate with a first hinge 110 and a second hinge 112, the present disclosure may be used in the formation of a powered tailgate capable of rotating along more than two axes.

Figure 6:
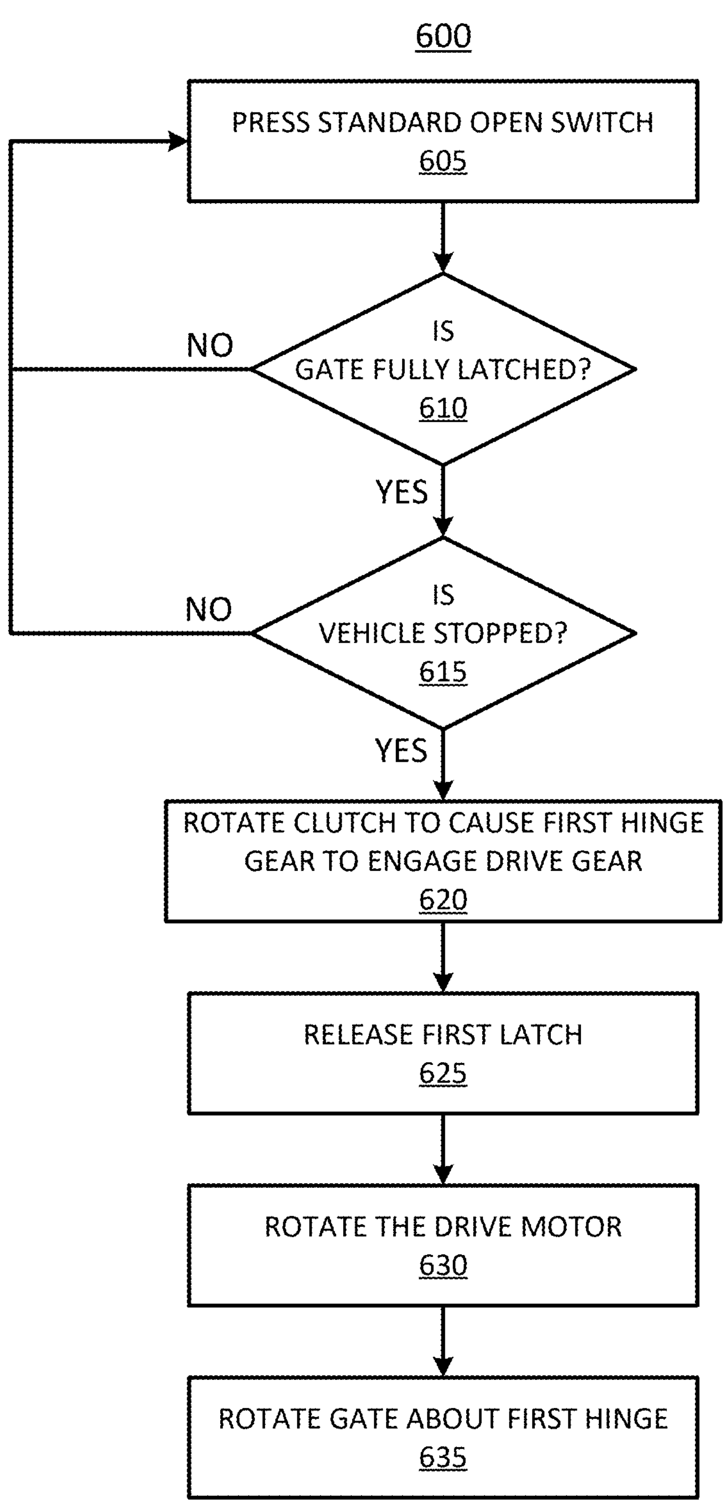
FIG. 6 illustrates a flow chart of a method for operating a dual-axis power tailgate to cause the gate of the dual-axis power tailgate to rotate about a first hinge, according to an exemplary embodiment of the present disclosure.

Referring now to FIG. 6, a flowchart of a method 600 for operating a dual-axis power tailgate to cause the gate of the dual-axis power tailgate to rotate about a first hinge is illustratively depicted, in accordance with an exemplary embodiment of the present disclosure.

At 605, a standard open switch or other suitable switching device may be activated (e.g., pressed). According to an exemplary embodiment, this switch may be configured to indicate, to the dual-axis motor tailgate, that a request is made to rotate the gate of the dual-axis motor tailgate about the first hinge.

At 610, it is determined whether the gate of the dual-axis power tailgate is fully latched. According to an exemplary embodiment, the gate of the dual-axis power tailgate may be fully latched when each of the latches of the dual-axis power tailgate (e.g., the first latch and the second latch) are secured. According to an exemplary embodiment, when the gate of the dual-axis power tailgate is not fully secured, then the method returns to await the completion of step 605.

According to an exemplary embodiment, when the gate of the dual-axis power tailgate is fully latched, then, at 615, it is determined whether the vehicle on which the dual-axis power tailgate is secured is fully stopped. Whether the vehicle is stopped may be determined via one or more suitable sensors such as, e.g., speed sensors, position sensors, and/or other suitable sensors. According to an exemplary embodiment, when the vehicle on which the dual-axis power tailgate is secured is not fully stopped, then the method returns to await the completion of step 605. According to an exemplary embodiment, when the gate of the dual-axis power tailgate is fully latched and the vehicle on which the dual-axis power tailgate is secured is fully stopped, then, at 620, the clutch motor rotates the clutch to engage the drive motor with the first hinge gear.

While step 610 is illustratively placed before step 615, it is noted that steps 610 and 615 may be performed simultaneously or in reverse order while maintaining the spirit and functionality of the present disclosure.

According to an exemplary embodiment, once the clutch motor rotates to engage the drive motor with the first hinge gear, the first latch, at 625 is released and the drive motor, at 630, rotates. The rotation of the drive motor causes the gate of the dual-axis power tailgate to rotate about the first hinge, at 635.

Figure 7:
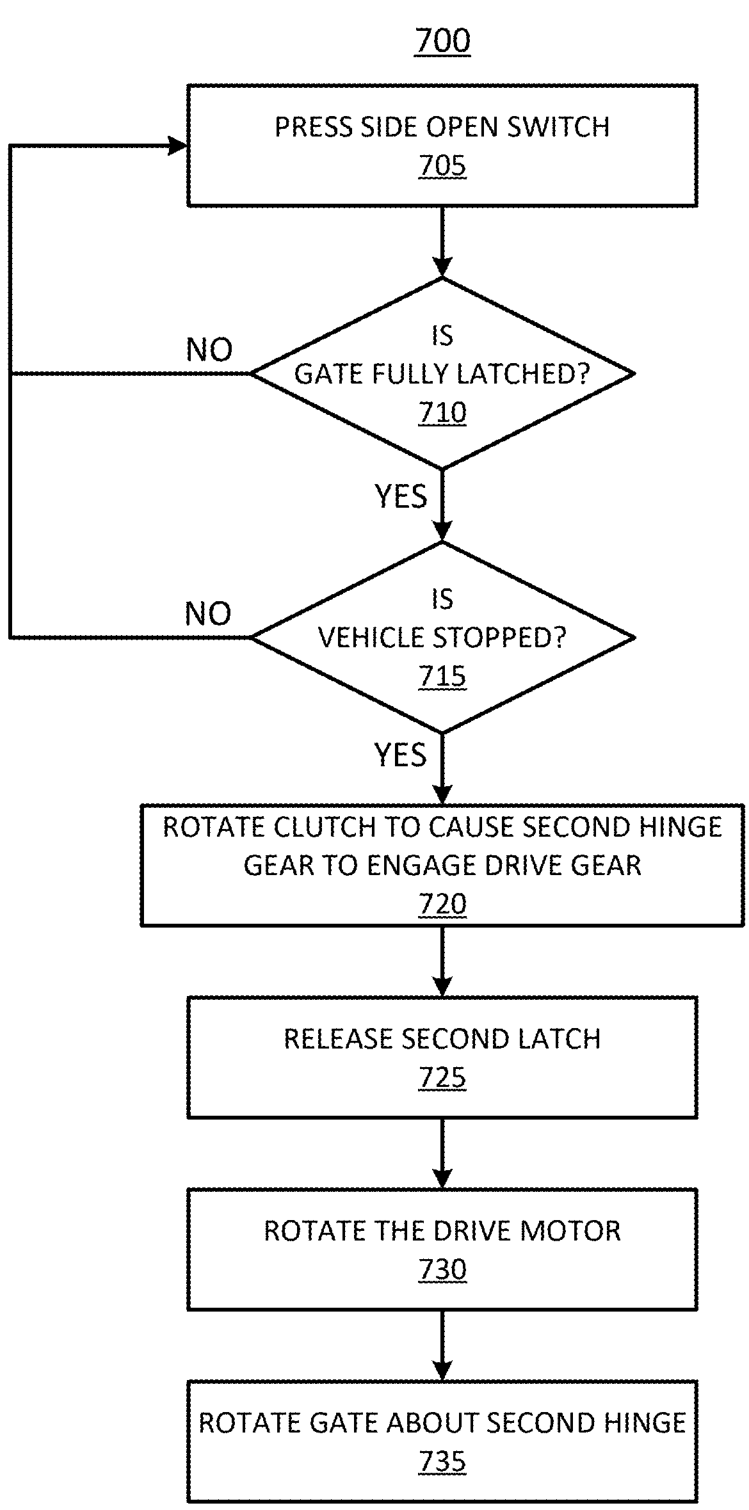
FIG. 7 illustrates a flow chart of a method for operating a dual-axis power tailgate to cause a portion of the gate of the dual-axis power tailgate to rotate about a second hinge, according to an exemplary embodiment of the present disclosure.

Referring now to FIG. 7, a flowchart of a method 700 for operating a dual-axis power tailgate to cause a portion of the gate of the dual-axis power tailgate to rotate about a second hinge is illustratively depicted, in accordance with an exemplary embodiment of the present disclosure.

At 705, a side open switch or other suitable switching device may be activated (e.g., pressed). According to an exemplary embodiment, this switch may be configured to indicate, to the dual-axis motor tailgate, that a request is made to rotate the portion of the gate of the dual-axis motor tailgate about the second hinge.

At 710, it is determined whether the gate of the dual-axis power tailgate is fully latched. According to an exemplary embodiment, the gate of the dual-axis power tailgate may be fully latched when each of the latches of the dual-axis power tailgate (e.g., the first latch and the second latch) are secured. According to an exemplary embodiment, when the gate of the dual-axis power tailgate is not fully secured, then the method returns to await the completion of step 705.

According to an exemplary embodiment, when the gate of the dual-axis power tailgate is fully latched, then, at 715, it is determined whether the vehicle on which the dual-axis power tailgate is secured is fully stopped. Whether the vehicle is stopped may be determined via one or more suitable sensors such as, e.g., speed sensors, position sensors, and/or other suitable sensors. According to an exemplary embodiment, when the vehicle on which the dual-axis power tailgate is secured is not fully stopped, then the method returns to await the completion of step 605. According to an exemplary embodiment, when the gate of the dual-axis power tailgate is fully latched and the vehicle on which the dual-axis power tailgate is secured is fully stopped, then, at 720, the clutch motor rotates the clutch to engage the drive motor with the second hinge gear.

While step 710 is illustratively placed before step 715, it is noted that steps 710 and 715 may be performed simultaneously or in reverse order while maintaining the spirit and functionality of the present disclosure.

According to an exemplary embodiment, once the clutch motor rotates to engage the drive motor with the second hinge gear, the second latch, at 725 is released and the drive motor, at 730, rotates. The rotation of the drive motor causes the portion of the gate of the dual-axis power tailgate to rotate about the second hinge, at 735.

Figure 8:
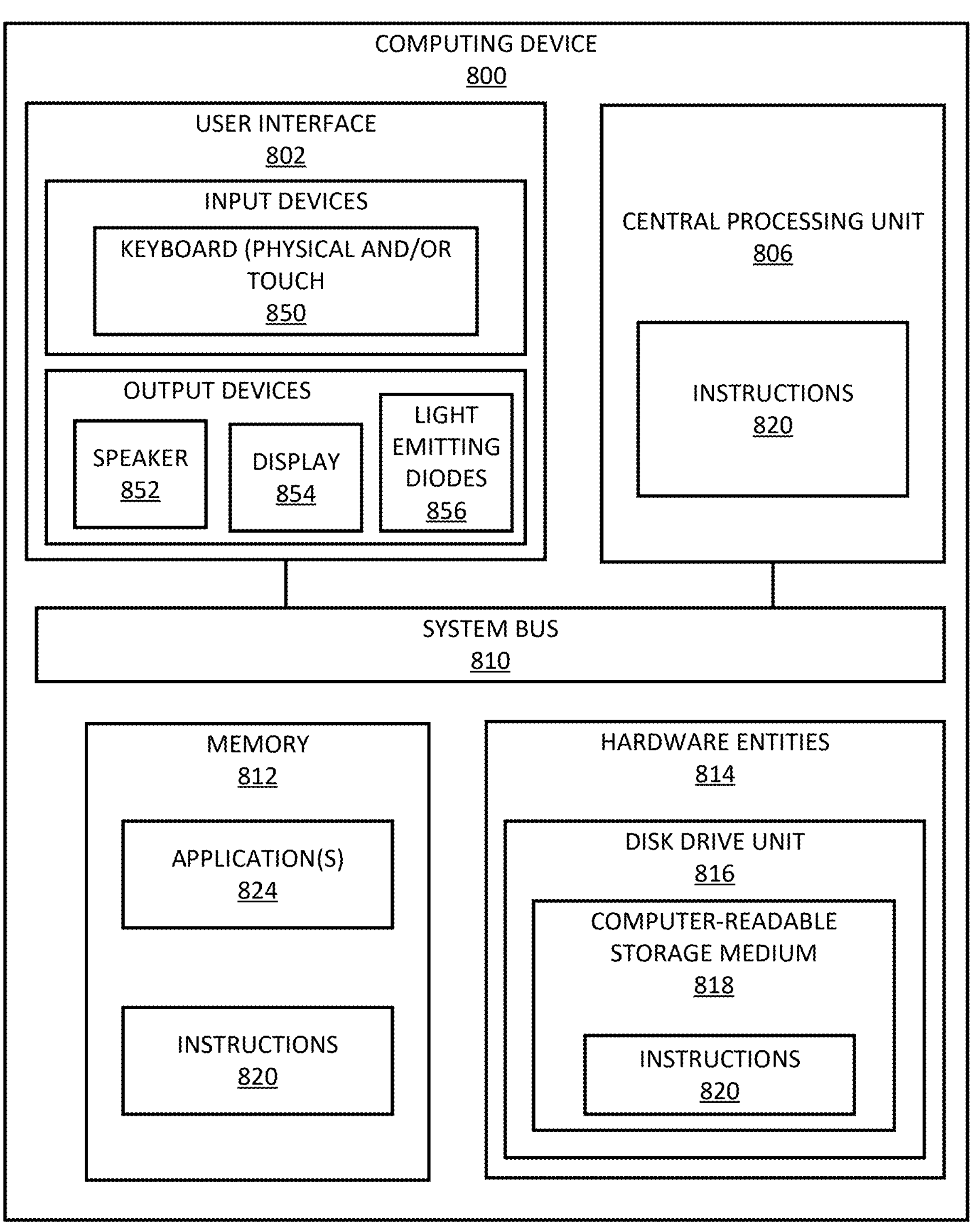
FIG. 8 illustrates example elements of a computing device, according to an exemplary embodiment of the present disclosure.

Referring now to FIG. 8, an illustration of an example architecture for a computing device 800 is provided. According to an exemplary embodiment, one or more functions of the present disclosure may be implemented by a computing device such as, e.g., computing device 800 or a computing device similar to computing device 800. Computing device 800 may be a quantum computer, a classical computer, and/or have one or more components configured to perform one or more quantum and/or classical computing functions.

The hardware architecture of FIG. 8 represents one example implementation of a representative computing device configured to perform one or more methods for controlling a dual-axis power tailgate (e.g., dual-axis power tailgate 100), as described herein. As such, the computing device 800 of FIG. 8 may be configured to implement at least a portion of the method(s) described herein (e.g., method 600 of FIG. 6 and method 700 of FIG. 7).

Some or all components of the computing device 800 may be implemented as hardware, software, and/or a combination of hardware and software. The hardware may comprise, but is not limited to, one or more electronic circuits. The electronic circuits may comprise, but are not limited to, passive components (e.g., resistors and capacitors) and/or active components (e.g., amplifiers and/or microprocessors). The passive and/or active components may be adapted to, arranged to, and/or programmed to perform one or more of the methodologies, procedures, or functions described herein.

As shown in FIG. 8. the computing device 800 may comprise a user interface 802 (e.g., a graphical user interface), a Central Processing Unit ("CPU") 806, a system bus 810, a memory 812 connected to and accessible by other portions of computing device 800 through system bus 810, and hardware entities 814 connected to system bus 810. The user interface may comprise input devices and output devices, which may be configured to facilitate user-software interactions for controlling operations of the computing device 800. The input devices may comprise, but are not limited to, a physical and/or touch keyboard 840. The input devices may be connected to the computing device 800 via a wired or wireless connection (e.g., a Bluetooth® connection). The output devices may comprise, but are not limited to, a speaker 842, a display 844, and/or light emitting diodes 846.

At least some of the hardware entities 814 may be configured to perform actions involving access to and use of memory 812, which may be a Random Access Memory (RAM), a disk driver and/or a Compact Disc Read Only Memory (CD-ROM), among other suitable memory types. Hardware entities 814 may comprise a disk drive unit 816 comprising a computer-readable storage medium 818 on which may be stored one or more sets of instructions 820 (e.g., programming instructions such as, but not limited to, software code) configured to implement one or more of the methodologies, procedures, or functions described herein. The instructions 820 may also reside, completely or at least partially, within the memory 812 and/or within the CPU 806 during execution thereof by the computing device 800.

The memory 812 and the CPU 806 may also constitute machine-readable media. The term "machine-readable media", as used here, refers to a single medium or multiple media (e.g., a centralized or distributed database, and/or associated caches and servers) that store the one or more sets of instructions 820. The term "machine-readable media", as used here, also refers to any medium that is capable of storing, encoding, or carrying a set of instructions 820 for execution by the computing device 800 and that cause the computing device 800 to perform any one or more of the methodologies of the present disclosure.

Figure 9:
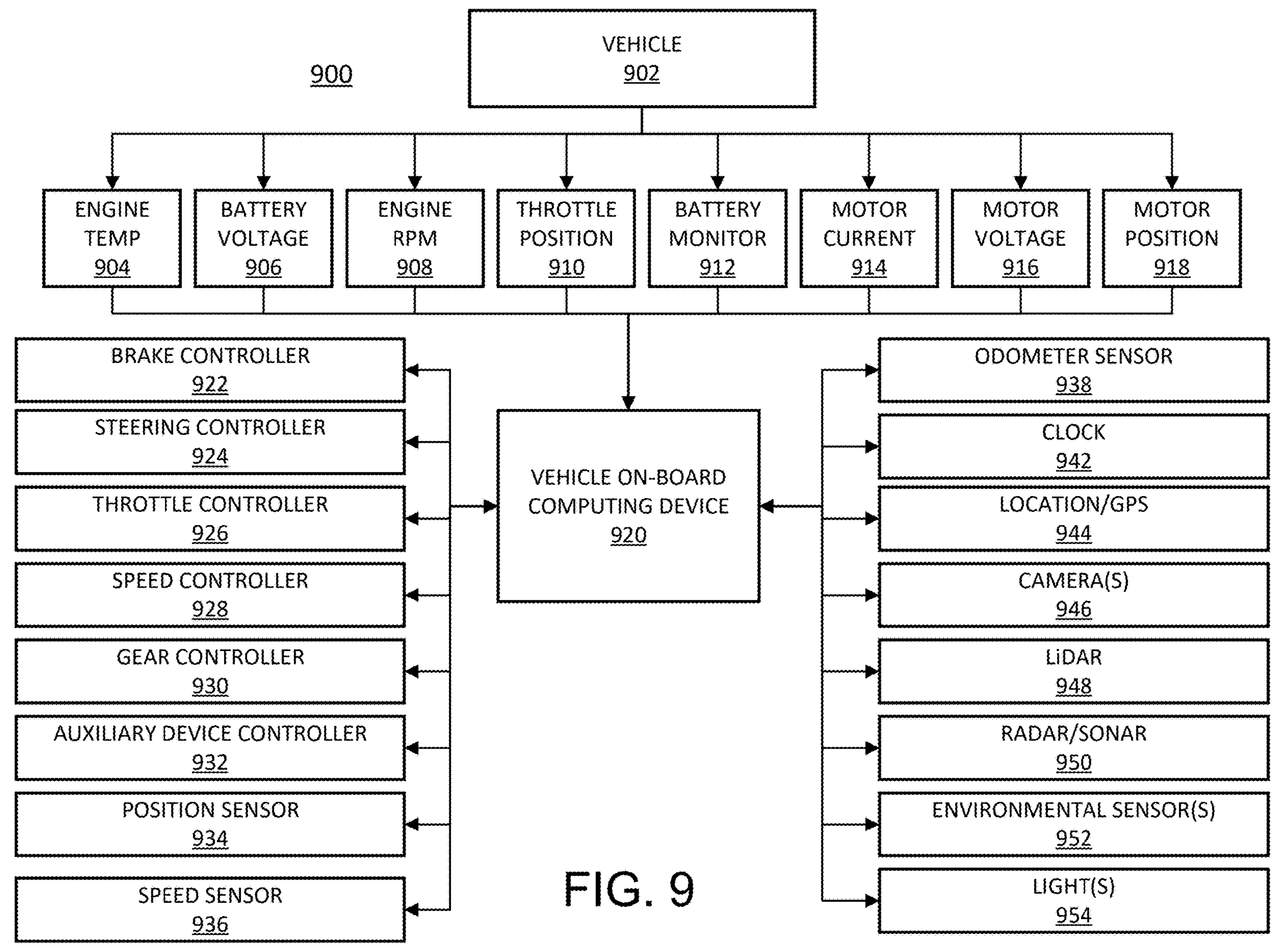
FIG. 9 illustrates an example architecture of a vehicle, according to an exemplary embodiment of the present disclosure.

Referring now to FIG. 9, an example vehicle system architecture 900 for a vehicle is provided, in accordance with an exemplary embodiment of the present disclosure.

The dual-axis power tailgate 100 and vehicle 102 may be configured to be incorporated in or with a vehicle having the same or similar system architecture as that shown in FIG. 9. Thus, the following discussion of vehicle system architecture 900 is sufficient for understanding one or more components of a vehicle into or with which the dual-axis power tailgate 100 may be incorporated.

As shown in FIG. 9, the vehicle system architecture 900 may comprise an engine, motor or propulsive device (e.g., a thruster) 902 and various sensors 904-918 for measuring various parameters of the vehicle system architecture 900. In gas-powered or hybrid vehicles having a fuel-powered engine, the sensors 904-918 may comprise, for example, an engine temperature sensor 904, a battery voltage sensor 906, an engine Rotations Per Minute (RPM) sensor 908, and/or a throttle position sensor 910. If the vehicle is an electric or hybrid vehicle, then the vehicle may comprise an electric motor, and accordingly may comprise sensors such as a battery monitoring system 912 (to measure current, voltage and/or temperature of the battery), motor current 914 and voltage 916 sensors, and motor position sensors such as resolvers and encoders 918.

Operational parameter sensors that are common to both types of vehicles may comprise, for example: a position sensor 934 such as an accelerometer, gyroscope and/or inertial measurement unit; a speed sensor 936; and/or an odometer sensor 938. The vehicle system architecture 900 also may comprise a clock 942 that the system uses to determine vehicle time and/or date during operation. The clock 942 may be encoded into the vehicle on-board computing device 920, it may be a separate device, or multiple clocks may be available.

The vehicle system architecture 900 also may comprise various sensors that operate to gather information about the environment in which the vehicle is traveling. These sensors may comprise, for example: a location sensor 944 (for example, a Global Positioning System (GPS) device); object detection sensors such as one or more cameras 946; a LiDAR sensor system 948; and/or a RADAR and/or a sonar system 950. The sensors also may comprise environmental sensors 952 such as, e.g., a humidity sensor, a precipitation sensor, a light sensor, and/or ambient temperature sensor. The object detection sensors may be configured to enable the vehicle system architecture 900 to detect objects that are within a given distance range of the vehicle in any direction, while the environmental sensors 952 may be configured to collect data about environmental conditions within the vehicle's area of travel. According to an exemplary embodiment, the vehicle system architecture 900 may comprise one or more lights 954 (e.g., headlights, flood lights, flashlights, etc.).

During operations, information may be communicated from the sensors to an on-board computing device 920 (e.g., computing device 140 and computing device 800). The on-board computing device 920 may be configured to analyze the data captured by the sensors and/or data received from data providers and may be configured to optionally control operations of the vehicle system architecture 900 based on results of the analysis. For example, the on-board computing device 920 may be configured to control: braking via a brake controller 922; direction via a steering controller 924; speed and acceleration via a throttle controller 926 (in a gas-powered vehicle) or a motor speed controller 928 (such as a current level controller in an electric vehicle); a differential gear controller 930 (in vehicles with transmissions); and/or other controllers. The brake controller 922 may comprise a pedal effort sensor, pedal effort sensor, and/or simulator temperature sensor, as described herein.

Geographic location information may be communicated from the location sensor 944 to the on-board computing device 920, which may then access a map of the environment that corresponds to the location information to determine known fixed features of the environment such as streets, buildings, stop signs and/or stop/go signals. Captured images from the cameras 946 and/or object detection information captured from sensors such as LiDAR 948 may be communicated from those sensors to the on-board computing device 920. The object detection information and/or captured images may be processed by the on-board computing device 920 to detect objects in proximity to the vehicle. Any known or to be known technique for making an object detection based on sensor data and/or captured images may be used in the embodiments disclosed in this document.

What has been described above includes examples of the subject disclosure. It is, of course, not possible to describe every conceivable combination of components or methodologies for purposes of describing the subject matter, but it is to be appreciated that many further combinations and permutations of the subject disclosure are possible. Accordingly, the claimed subject matter is intended to embrace all such alterations, modifications, and variations that fall within the spirit and scope of the appended claims.

In particular and in regard to the various functions performed by the above described components, devices, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter.

The aforementioned systems and components have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components. Any components described herein may also interact with one or more other components not specifically described herein.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Thus, the embodiments and examples set forth herein were presented in order to best explain various selected embodiments of the present invention and its particular application and to thereby enable those skilled in the art to make and use embodiments of the invention. However, those skilled in the art will recognize that the foregoing description and examples have been presented for the purposes of illustration and example only. The description as set forth is not intended to be exhaustive or to limit the embodiments of the invention to the precise form disclosed.

What is claimed is:

1. A dual-axis motorized tailgate, comprising:

a gate portion comprising a first hinge and a second hinge, wherein the gate portion is configured to rotate about an axis of the first hinge, a portion of the gate portion is configured to rotate about an axis of the second hinge, and the axis of the second hinge is perpendicular to the axis of the first hinge;

a first hinge gear, wherein the first hinge gear is configured such that rotation of the first hinge gear causes the gate portion to rotate about the axis of the first hinge;

a second hinge gear, wherein the second hinge gear is configured such that rotation of the second hinge gear causes the portion of the gate portion to rotate about the axis of the second hinge;

a drive motor and a drive gear, wherein the drive motor is configured to rotate the drive gear; and a clutch motor and a clutch, wherein the clutch motor is configured to cause the clutch to:

engage the first hinge gear with the drive gear;

disengage the first hinge gear with the drive gear;

engage the second hinge gear with the drive gear; and disengage the second hinge gear with the drive gear.

2. The dual-axis motorized tailgate of claim 1, wherein the drive motor is configured to rotate the first hinge gear when the first hinge gear is engaged with the drive gear.

3. The dual-axis motorized tailgate of claim 1, wherein the drive motor is configured to rotate the second hinge gear when the second hinge gear is engaged with the drive gear.

4. The dual-axis motorized tailgate of claim 1, further comprising one or more slotted rails, wherein:

the drive motor is coupled to the one or more slotted rails, the drive motor is configured to move along one or more slots within the one or more slotted rails, and the clutch motor is configured to cause the clutch to move the drive motor along the one or more slots within the one or more slotted rails.

5. The dual-axis motorized tailgate of claim 1, wherein the first hinge comprises a pivot-cup hinge.

6. The dual-axis motorized tailgate of claim 1, further comprising a spindle drive coupled to the second hinge gear, wherein the second hinge gear is configured to rotate the spindle drive when the second hinge gear is rotated.

7. The dual-axis motorized tailgate of claim 1, further comprising:

a first latch configured, when engaged, to prevent the gate portion from rotating about the axis of the first hinge; and a second latch configured, when engaged, to prevent the portion of the gate portion from rotating about the axis of the second hinge.

8. The dual-axis motorized tailgate of claim 1, further comprising a computing device configured to control one or more of: the drive motor; and the clutch motor.

9. A dual-axis motorized tailgate system, comprising:

a vehicle; and a dual-axis motorized tailgate, coupled to the vehicle, wherein the dual-axis motorized tailgate comprises:

a gate portion comprising a first hinge and a second hinge, wherein the gate portion is configured to rotate about an axis of the first hinge, a portion of the gate portion is configured to rotate about an axis of the second hinge, and the axis of the second hinge is perpendicular to the axis of the first hinge;

a first hinge gear, wherein the first hinge gear is configured such that rotation of the first hinge gear causes the gate portion to rotate about the axis of the first hinge;

a second hinge gear, wherein the second hinge gear is configured such that rotation of the second hinge gear causes the portion of the gate portion to rotate about the axis of the second hinge;

a drive motor and a drive gear, wherein the drive motor is configured to rotate the drive gear; and a clutch motor and a clutch, wherein:

the clutch motor is configured to cause the clutch to:

engage the first hinge gear with the drive gear;

disengage the first hinge gear with the drive gear;

engage the second hinge gear with the drive gear; and disengage the second hinge gear with the drive gear.

10. The dual-axis motorized tailgate system of claim 9, wherein the drive motor is configured to rotate the first hinge gear when the first hinge gear is engaged with the drive gear.

11. The dual-axis motorized tailgate system of claim 9, wherein the drive motor is configured to rotate the second hinge gear when the second hinge gear is engaged with the drive gear.

12. The dual-axis motorized tailgate system of claim 9, wherein the dual-axis motorized tailgate further comprises one or more slotted rails, wherein:

the drive motor is coupled to the one or more slotted rails, the drive motor is configured to move along one or more slots within the one or more slotted rails, and the clutch motor is configured to cause the clutch to move the drive motor along the one or more slots within the one or more slotted rails.

* * * * *